No. 891,998. PATENTED JUNE 30, 1908.
G. W. KNIGHT.
CONCRETE MANIFOLD SYSTEM.
APPLICATION FILED MAY 6, 1907.

2 SHEETS—SHEET 1.

WITNESSES. INVENTOR.

No. 891,998. PATENTED JUNE 30, 1908.
G. W. KNIGHT.
CONCRETE MANIFOLD SYSTEM.
APPLICATION FILED MAY 6, 1907.
2 SHEETS—SHEET 2.
FIG. 3
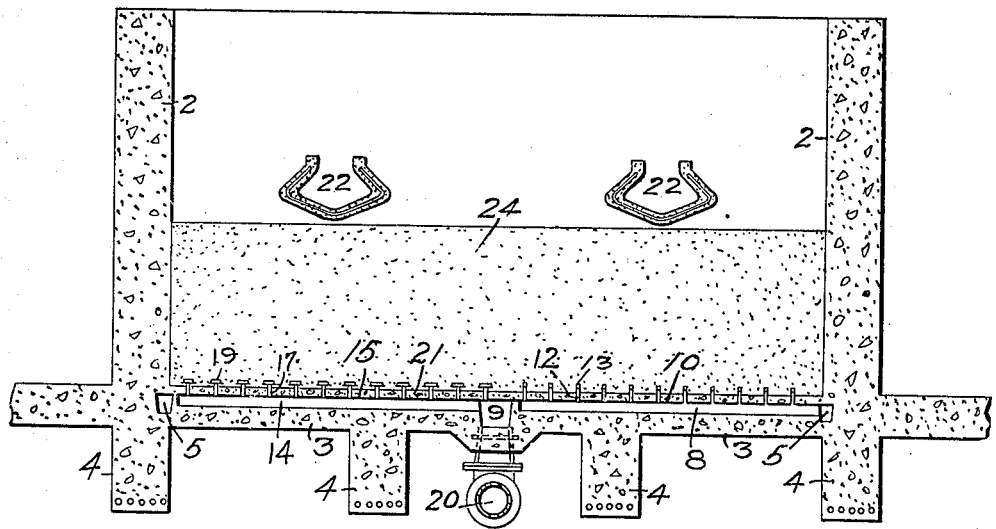
FIG. 4 FIG. 5
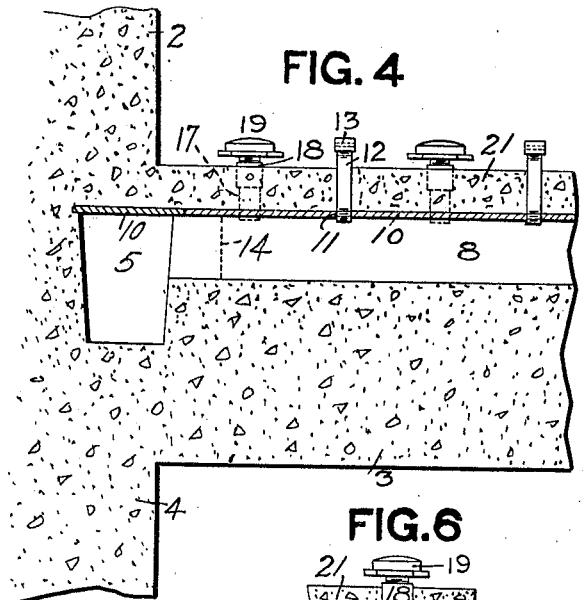 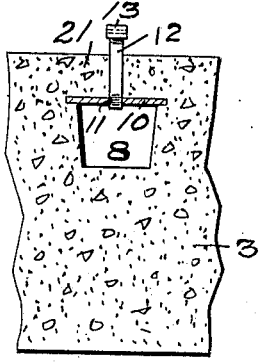
FIG. 6
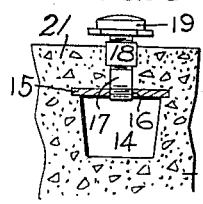
WITNESSES. INVENTOR.

UNITED STATES PATENT OFFICE.

GERALD W. KNIGHT, OF PITTSBURG, PENNSYLVANIA, ASSIGNOR TO PITTSBURGH FILTER MANUFACTURING COMPANY, OF PITTSBURG, PENNSYLVANIA, A CORPORATION OF PENNSYLVANIA.

CONCRETE MANIFOLD SYSTEM.

No. 891,998.      Specification of Letters Patent.      Patented June 30, 1908.

Application filed May 6, 1907. Serial No. 372,264.

*To all whom it may concern:*

Be it known that I, GERALD W. KNIGHT, a resident of Pittsburg, in the county of Allegheny and State of Pennsylvania, have invented a new and useful Improvement in Concrete Manifold Systems; and I do hereby declare the following to be a full, clear, and exact description thereof.

My invention relates to a manifold system for filters.

The object of the invention is to provide a manifold system for filters in which the complicated pipe work with its joints and connections is dispensed with, thereby greatly simplifying the construction as well as preventing liability of leakage and reducing the cost.

To these ends my invention comprises, generally stated, a filtering tank or reservoir having the bottom formed of concrete and water ducts formed directly in said concrete, said ducts being provided with the strainers and nozzles required in connection with filter plants of this character.

Figure 1:
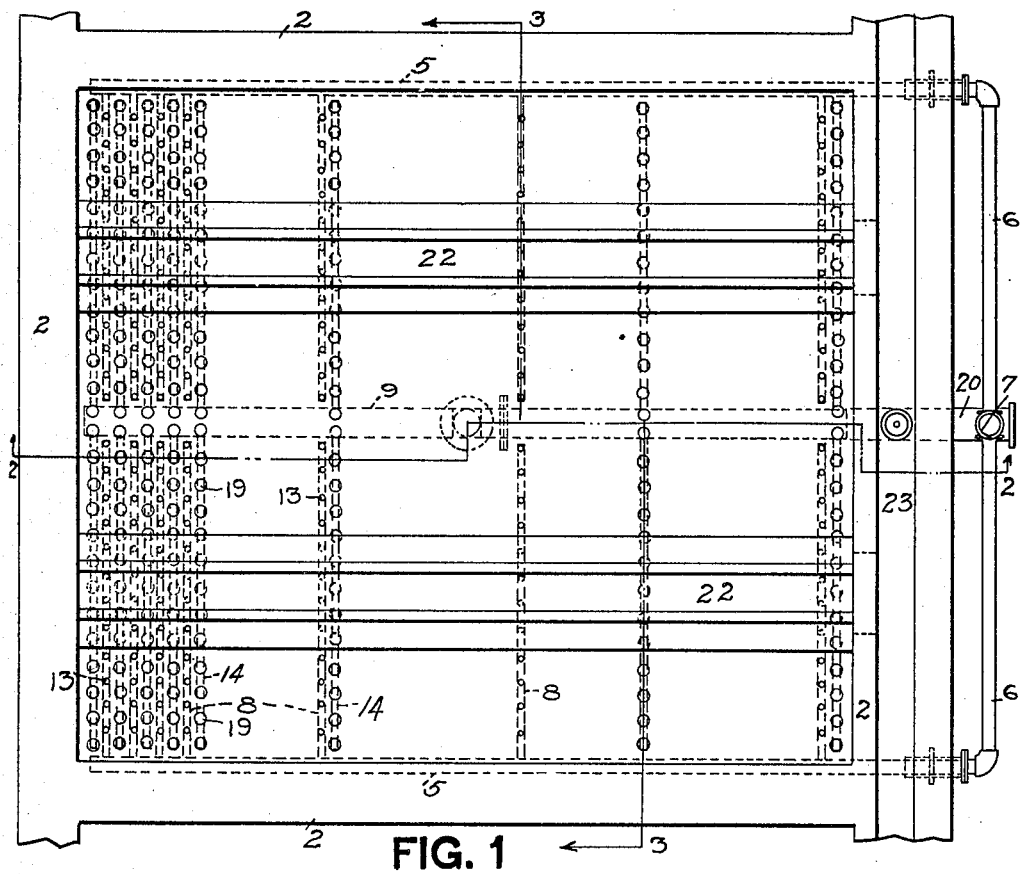
Figure 2:
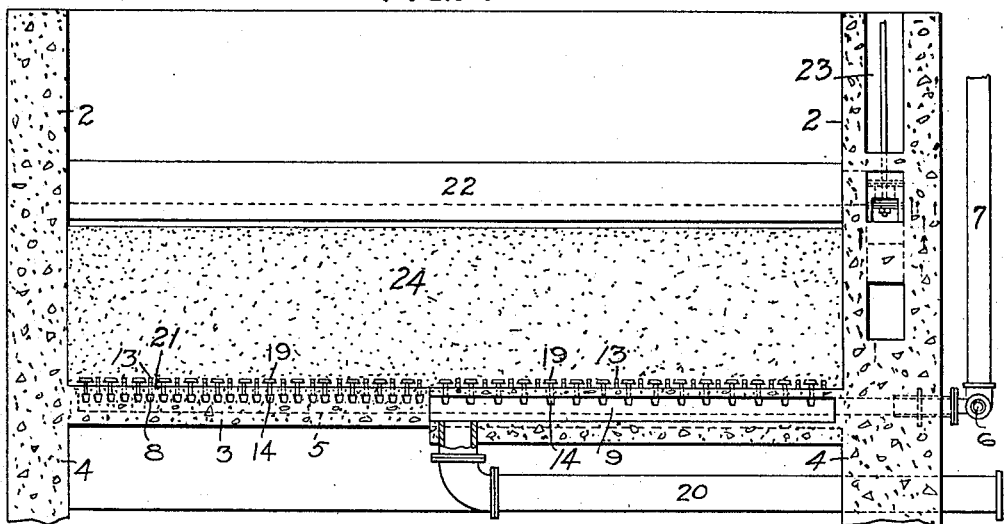

In the accompanying drawing Figure 1 is a plan view of my improved manifold system; Fig. 2 is a section on the line 2—2, Fig. 1; Fig. 3 is a section on the line 3—3, Fig. 1, and Fig. 4 is an enlarged sectional detail. Figs. 5 and 6 are detail views in section showing the manner of securing the nozzles and strainers in place.

Referring to the drawings, the numeral 2 designates the walls of a filter tank or reservoir, said tank being provided with the concrete bottom 3 and the foundation walls 4. Formed within the walls 2 are the main air ducts 5, said air ducts being supplied with air from the pipes 6 on the exterior which are connected up to the main air supply pipe 7 leading from a suitable blower or compressor. Extending from the main air ducts 5 at the opposite sides of the reservoir are the air ducts 8, said air ducts extending over to about the middle point of said reservoir or adjacent to the main water manifold 9. The main air ducts 5 as well as the branch air ducts 8 are formed in the concrete during the construction of the bottom 3. The air ducts formed in this way are then covered with metal plates 10 of suitable thickness, said plates being provided with threaded openings 11 to receive the inner threaded ends of the nipples 12. Secured to the upper ends of the nipples 12 are the nozzles 13. In the same manner the water ducts 14 are formed directly in the concrete extending from the main water duct or manifold 9 arranged centrally of the tank to points adjacent to the main air ducts and are likewise covered with metal plates 15. These metal plates 15 are provided with threaded openings 16 to receive the threaded nipples 17. Connected to the threaded nipples 17 are the couplings 18 and connected to said couplings are suitable strainers 19. The main water duct 9 is likewise formed in the concrete bottom 3 substantially centrally thereof. Connected up to said central water duct is the outlet pipe 20 by means of which the filtered water is conveyed to a suitable clear water basin or said pipe 20 may in the ordinary manner be connected up to the wash water for washing the filter, as fully hereinafter set forth.

When the air ducts and water ducts have been formed in the manner above described, a layer of concrete 21 is then laid over the metal plates 10 and 15. Before applying this upper layer of concrete it will be found desirable to plug up the nipples 12 and the couplings 18 so as to prevent the concrete employed for making this upper layer from getting into these nipples and closing up the passage. Under these conditions the nozzles 13 and strainers 19 will not be applied to the nipples until after the layer of concrete 21 has been added. In this manner I build up a manifold system for the air and water within the concrete itself while at the same time by the use of metal plates forming the upper faces of said ducts I provide a means for fastening the nozzles and strainers rigidly and securely in position.

The tank may be provided with suitable overflow troughs 22 which extend from end wall to end wall of the tank, said troughs being supplied with the unfiltered water from the channel 23 in the walls of the tank. The tank is also provided with a suitable filter bed 24 composed of sand, gravel, etc. resting upon the concrete bottom 3.

When the filter is in operation the unfiltered water entering the trough 22 overflows therefrom and passes down through the filter bed 24. The filtered water passes through the strainers 19 into the water ducts 14 whence it flows into the main water duct 9 to be carried off therefrom by the pipe 20 to the clear water basin. When it is desired to wash the filter bed the supply of water to the troughs 22 is cut off and the discharge from said troughs is connected with the sewer whereupon the water is admitted into the pipe 20 and forced up through the water ducts and strainers into the filter bed. At the same time or, if it is desired, previous thereto, the air is admitted to the main air ducts 5, whence it passes into the air ducts 8 to escape through the nozzles 13 into the filter bed. The action of the air and water when admitted to the filter bed in this manner adjacent to each other acts to agitate and disturb the filter bed so as to break up the mass and thoroughly cleanse and wash out the impurities, which are forced to the top and overflow into the troughs 22 to be carried off therefrom to the sewer.

What I claim is:

1. A manifold system for concrete filters comprising a series of concrete ducts or conduits formed directly in the concrete constituting the bottom or walls of said filter.

2. A manifold system for concrete filters comprising a series of concrete ducts or conduits formed directly in the concrete constituting the bottom or walls of said filter, and strainers or like devices forming communication between said ducts and the filter bed.

3. A manifold system for concrete filters comprising a series of concrete ducts or conduits formed directly in the concrete constituting the bottom or walls of said filter, metal plates forming the upper inner faces of said ducts, and strainers or like devices engaging openings in said plates.

4. A manifold system for concrete filters comprising a series of concrete ducts or conduits formed directly in the concrete constituting the bottom or walls of said filter, metal plates forming the upper inner faces of said ducts, strainers or like devices engaging openings in said plates, and a layer of concrete on said plates.

In testimony whereof, I the said GERALD W. KNIGHT have hereunto set my hand.

GERALD W. KNIGHT.

Witnesses:
ROBERT C. TOTTEN,
ROBT. D. TOTTEN.